(12) United States Patent
Tibah

(10) Patent No.: US 11,053,391 B2
(45) Date of Patent: Jul. 6, 2021

(54) POLYMER MODIFIED ASPHALT FOR INDUSTRIAL APPLICATIONS

(71) Applicant: Denis Muki Tibah, Waxahachie, TX (US)

(72) Inventor: Denis Muki Tibah, Waxahachie, TX (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 15/726,752

(22) Filed: Oct. 6, 2017

(65) Prior Publication Data

US 2018/0112074 A1 Apr. 26, 2018

Related U.S. Application Data

(60) Provisional application No. 62/405,013, filed on Oct. 6, 2016.

(51) Int. Cl.
*C08L 95/00* (2006.01)
*C10C 3/04* (2006.01)

(52) U.S. Cl.
CPC .............. *C08L 95/00* (2013.01); *C10C 3/04* (2013.01)

(58) Field of Classification Search
None
See application file for complete search history.

(56) References Cited

U.S. PATENT DOCUMENTS

| | | |
|---|---|---|
| 1,782,186 A | 11/1930 | Abson |
| 2,179,208 A | 11/1936 | Burk et al. |
| 2,200,914 A | 5/1940 | Burk et al. |
| 2,287,511 A | 6/1942 | Burk et al. |
| 2,370,007 A | 2/1945 | Carr |
| 2,375,117 A | 5/1945 | Lentz |
| 2,450,756 A | 10/1948 | Hoiberg |
| 2,762,755 A | 9/1956 | Kinnaird, Jr. |
| 2,762,756 A | 9/1956 | Kinnaird, Jr. |
| 3,126,329 A | 3/1964 | Fort |
| 4,000,000 A | 12/1976 | Mendenhall |
| 4,338,137 A | 7/1982 | Goodrich |
| 4,382,989 A | 10/1983 | Chang et al. |
| 4,497,921 A | 2/1985 | Chang et al. |
| 4,544,411 A | 10/1985 | Wombles |
| 4,554,023 A | 11/1985 | Janicki et al. |
| 4,584,023 A | 4/1986 | Goodrich |
| 4,659,389 A | 4/1987 | Wombles |
| 4,777,064 A * | 10/1988 | Stone ............... C08L 95/00 208/23 |
| 5,711,796 A * | 1/1998 | Grzybowski ........ C08L 95/00 106/281.1 |
| 7,317,045 B2 | 1/2008 | Zanchetta et al. |
| 7,374,659 B1 * | 5/2008 | Burris ................ C10C 3/04 208/22 |
| 7,503,724 B2 * | 3/2009 | Blacklidge ........ C08L 95/005 404/101 |
| 7,857,904 B2 | 12/2010 | Trumbore et al. |
| 7,901,563 B2 | 3/2011 | Ruan et al. |
| 7,951,239 B2 | 5/2011 | Trumbore et al. |
| 8,753,442 B2 | 6/2014 | Trumbore et al. |
| 8,808,445 B2 | 8/2014 | Coe |
| 8,901,211 B2 | 12/2014 | Stephens et al. |
| 8,926,742 B2 | 1/2015 | Coe |
| 9,688,882 B2 * | 6/2017 | Quinn ................ C09D 195/00 |
| 10,336,906 B2 * | 7/2019 | Lewandowski ........ C10C 3/04 |

* cited by examiner

*Primary Examiner* — Tae H Yoon
(74) *Attorney, Agent, or Firm* — Alvin T. Rockhill; Joshua C. Malino

(57) ABSTRACT

This invention provides for a method for producing polymer modified asphalt using base asphalt (bitumen) blended with partially air blown ("puffed") asphalt which is further modified with polymers and additives to attain desired properties for industrial applications. The partially blown or blown asphalt is oxidized to a target softening point to suit the application. In another embodiment, the base asphalt is blended with hard PEN asphalt ("Zero PEN Asphalt") which is further modified with polymers and additives to attain desired properties. By using the partially oxidized asphalt or blending the base asphalt with partially oxidized asphalt or hard PEN asphalt, the amount of polymers and additives needed to achieve desired properties and performance are significantly reduced. This technique can be used to attain polymer modified asphalt having a highly desirable combination of characteristics not otherwise attainable using the base asphalt.

17 Claims, 1 Drawing Sheet

| Block # | Example | Base Asphalt % | Hard PEN % | Partially Blown Asphalt % | Base Asphalt Blown to Roofing coating Softening Point Target % | RET % | GTR% | Polyolefin % | SBS% | SEBS % | Plasticizer % | Wax % | Softening Point (°F) | Viscosity at 400°F (cP) | PEN at 77°F (dmm) |
|---|---|---|---|---|---|---|---|---|---|---|---|---|---|---|---|
| 1 | A | Base Asphalt 0.0 | 0.0 | 0.0 | 100.0 | 0.0 | 0.0 | 0.0 | 0.0 | 0.0 | 0.0 | 0.0 | 212.3 | 494 | 9.6 |
| | A1 | 0.0 | 0.0 | 91.0 | 0.0 | 0.0 | 0.0 | 0.0 | 0.0 | 4.0 | 4.0 | 1.0 | 209 | 309 | 17.5 |
| | A1-1 | 91.0 | 0.0 | 0.0 | 0.0 | 0.0 | 0.0 | 0.0 | 0.0 | 4.0 | 4.0 | 1.0 | 180 | 97 | 53.0 |
| | A1-2 | 87.0 | 0.0 | 0.0 | 0.0 | 0.0 | 0.0 | 0.0 | 0.0 | 8.0 | 4.0 | 1.0 | 200 | 215 | 40.3 |
| | A2 | 0.0 | 0.0 | 91.0 | 0.0 | 0.0 | 0.0 | 0.0 | 0.0 | 4.0 | 4.0 | 1.0 | 207 | 318 | 17.3 |
| | A2-1 | 91.0 | 0.0 | 0.0 | 0.0 | 0.0 | 0.0 | 0.0 | 0.0 | 4.0 | 4.0 | 1.0 | 178 | 99 | 61.3 |
| | A2-2 | 87.0 | 0.0 | 0.0 | 0.0 | 0.0 | 0.0 | 0.0 | 0.0 | 8.0 | 4.0 | 1.0 | 224 | 221 | 52.0 |
| 2 | B | Base Asphalt 0.0 | 0.0 | 0.0 | 100.0 | 0.0 | 0.0 | 0.0 | 0.0 | 0.0 | 0.0 | 0.0 | 209 | 395 | 11.0 |
| | B1 | 74.0 | 20.0 | 0.0 | 0.0 | 0.0 | 0.0 | 0.0 | 0.0 | 4.5 | 0.0 | 1.5 | 214 | 206 | 17.3 |
| | B1-1 | 94.0 | 0.0 | 0.0 | 0.0 | 0.0 | 0.0 | 0.0 | 0.0 | 4.5 | 0.0 | 1.5 | 202 | 124 | 37.0 |
| | B1-2 | 90.5 | 0.0 | 0.0 | 0.0 | 0.0 | 0.0 | 0.0 | 0.0 | 8.0 | 0.0 | 1.5 | 227 | 367 | 28.3 |
| | B2 | 74.0 | 20.0 | 0.0 | 0.0 | 0.0 | 0.0 | 0.0 | 0.0 | 4.5 | 0.0 | 1.5 | 213 | 185 | 22.0 |
| | B2-1 | 94.0 | 0.0 | 0.0 | 0.0 | 0.0 | 0.0 | 0.0 | 0.0 | 4.5 | 0.0 | 1.5 | 202 | 124 | 37.0 |
| | B2-2 | 90.5 | 0.0 | 0.0 | 0.0 | 0.0 | 0.0 | 0.0 | 0.0 | 8.0 | 0.0 | 1.5 | 227 | 367 | 28.3 |
| 3 | C | Base Asphalt 0.0 | 0.0 | 0.0 | 100.0 | 0.0 | 0.0 | 0.0 | 0.0 | 0.0 | 0.0 | 0.0 | 209 | 395 | 11.0 |
| | C1 | 75.5 | 20.0 | 0.0 | 0.0 | 2.0 | 0.0 | 0.0 | 0.5 | 0.0 | 0.0 | 2.0 | 245 | 108 | 26.0 |
| | C1-1 | 95.5 | 0.0 | 0.0 | 0.0 | 2.0 | 0.0 | 0.0 | 0.5 | 0.0 | 0.0 | 2.0 | 215 | 54 | 49.3 |
| | C1-2 | 93.5 | 0.0 | 0.0 | 0.0 | 4.0 | 0.0 | 0.0 | 0.5 | 0.0 | 0.0 | 2.0 | 233 | 115 | 44.0 |
| | C2 | 75.5 | 20.0 | 0.0 | 0.0 | 2.0 | 0.0 | 0.0 | 0.5 | 0.0 | 0.0 | 2.0 | 232 | 120 | 33.0 |
| | C2-1 | 95.5 | 0.0 | 0.0 | 0.0 | 2.0 | 0.0 | 0.0 | 0.5 | 0.0 | 0.0 | 2.0 | 213 | 83 | 40.0 |
| | C2-2 | 92.0 | 0.0 | 0.0 | 0.0 | 2.0 | 0.0 | 0.0 | 4.0 | 0.0 | 0.0 | 2.0 | 239 | 160 | 34.0 |
| | D1 | 75.5 | 0.0 | 20.0 | 0.0 | 2.0 | 0.0 | 0.0 | 0.5 | 0.0 | 0.0 | 2.0 | 253 | 136 | 27.0 |
| | D1-1 | 95.5 | 0.0 | 0.0 | 0.0 | 2.0 | 0.0 | 0.0 | 0.5 | 0.0 | 0.0 | 2.0 | 213 | 83 | 40.0 |
| | D1-2 | 92.0 | 0.0 | 0.0 | 0.0 | 2.0 | 0.0 | 0.0 | 4.0 | 0.0 | 0.0 | 2.0 | 239 | 160 | 34.0 |
| | D2 | 75.5 | 0.0 | 20.0 | 0.0 | 2.0 | 0.0 | 0.0 | 0.5 | 0.0 | 0.0 | 2.0 | 223 | 118 | 37.0 |
| | D1-1 | 95.5 | 0.0 | 0.0 | 0.0 | 2.0 | 0.0 | 0.0 | 0.5 | 0.0 | 0.0 | 2.0 | 220 | 95 | 34.0 |
| | D1-2 | 92.0 | 0.0 | 0.0 | 0.0 | 2.0 | 0.0 | 0.0 | 4.0 | 0.0 | 0.0 | 2.0 | 249 | 125 | 38.2 |
| 4 | E | Base Asphalt 0.0 | 0.0 | 0.0 | 100.0 | 0.0 | 0.0 | 0.0 | 0.0 | 0.0 | 0.0 | 0.0 | 208 | 391 | 8.0 |
| | E1 | 73 | 20.0 | 0.0 | 0.0 | 2.0 | 0.0 | 0.0 | 3.0 | 0.0 | 0.0 | 2.0 | 238 | 222 | 24.7 |
| | E1-1 | 93 | 0.0 | 0.0 | 0.0 | 2.0 | 0.0 | 0.0 | 3.0 | 0.0 | 0.0 | 2.0 | 223 | 144 | 36.0 |
| | E1-2 | 91.5 | 0.0 | 0.0 | 0.0 | 2.0 | 0.0 | 0.0 | 3.0 | 0.0 | 0.0 | 2.0 | 231 | 217 | 27.0 |
| | E2 | 73 | 20.0 | 0.0 | 0.0 | 2.0 | 0.0 | 0.0 | 3.0 | 0.0 | 0.0 | 2.0 | 232 | 154 | 28.3 |
| | E2-1 | 93 | 0.0 | 0.0 | 0.0 | 2.0 | 0.0 | 0.0 | 3.0 | 0.0 | 0.0 | 2.0 | 219 | 125 | 38.0 |
| | E2-2 | 91.5 | 0.0 | 0.0 | 0.0 | 2.0 | 0.0 | 0.0 | 3.0 | 0.0 | 0.0 | 2.0 | 252 | 196 | 32.0 |
| 5 | F | Base Asphalt 0.0 | 0.0 | 0.0 | 100.0 | 0.0 | 0.0 | 0.0 | 0.0 | 0.0 | 0.0 | 0.0 | 209 | 230 | 11.0 |
| | F1 | 73 | 20.0 | 0.0 | 0.0 | 0.0 | 2.5 | 3.0 | 0.0 | 0.0 | 0.0 | 1.5 | 219 | 236 | 29.0 |
| | F1-1 | 93 | 0.0 | 0.0 | 0.0 | 0.0 | 2.5 | 3.0 | 0.0 | 0.0 | 0.0 | 1.5 | 192 | 104 | 47.3 |
| | F1-2 | 91.5 | 0.0 | 0.0 | 0.0 | 0.0 | 2.5 | 4.5 | 0.0 | 0.0 | 0.0 | 1.5 | 211 | 172 | 42.3 |
| | F2 | 73 | 20.0 | 0.0 | 0.0 | 0.0 | 2.5 | 3.0 | 0.0 | 0.0 | 0.0 | 1.5 | 201 | 203 | 23.7 |
| | F2-1 | 93 | 0.0 | 0.0 | 0.0 | 0.0 | 2.5 | 3.0 | 0.0 | 0.0 | 0.0 | 1.5 | 189 | 122 | 33.5 |
| | F2-2 | 91.5 | 0.0 | 0.0 | 0.0 | 0.0 | 2.5 | 4.5 | 0.0 | 0.0 | 0.0 | 1.5 | 207 | 238 | 33.0 |
| 6 | G | Base Asphalt 0.0 | | | 100.0 | 0.0 | 0.0 | 0.0 | 0.0 | 0.0 | 0.0 | 0.0 | 212 | 494 | 9.6 |
| | G1 | 43 | 0.0 | 50.0 | 0.0 | 0.0 | 2.5 | 3.0 | 0.0 | 0.0 | 0.0 | 1.5 | 238 | 279 | 18.3 |
| | G1-1 | 93 | 0.0 | 0.0 | 0.0 | 0.0 | 2.5 | 3.0 | 0.0 | 0.0 | 0.0 | 1.5 | 202 | 139 | 37.3 |
| | G1-2 | 91.5 | 0.0 | 0.0 | 0.0 | 0.0 | 2.5 | 4.5 | 0.0 | 0.0 | 0.0 | 1.5 | 248 | 595 | 32.0 |

POLYMER MODIFIED ASPHALT FOR INDUSTRIAL APPLICATIONS

This application claims benefit of U.S. Provisional Patent Application Ser. No. 62/405,013, filed on Oct. 6, 2016. The teachings of U.S. Provisional Patent Application Ser. No. 62/405,013 are incorporated herein by reference in their entirety.

BACKGROUND OF THE INVENTION

Asphalt, which is widely known as bitumen outside of North America, offers outstanding binding and waterproofing characteristics. These physical attributes of asphalt have led to its widespread utilization in paving, roofing, and waterproofing applications. For instance, asphalt is used in manufacturing roofing shingles because it has the ability to bind sand, aggregate, and fillers to the roofing shingle while simultaneously providing excellent water barrier characteristics.

Naturally occurring asphalts have been used in various applications for hundreds of years. However, today almost all of the asphalt used in industrial applications is recovered from the refining of petroleum. Asphalt, or asphalt flux, is essentially the residue that remains after gasoline, kerosene, diesel fuel, jet fuel, and other hydrocarbon fractions have been removed during the refining of crude oil. In other words, asphalt flux is the last cut from the crude oil refining process.

Industrial asphalt for utilization in manufacturing roofing shingles and other products has generally been made by employing only certain grades of asphalt flux as a raw material. This specific type of asphalt, sometimes referred to a roofer's flux, is normally air blown to increase its softening point and to decrease its penetration value into ranges which are suitable for use in manufacturing roofing products. This specific type of asphalt typically has a higher penetration value and lower viscosity than the asphalt used in paving applications. However, these grades of asphalts that can be air blown into industrial asphalts for roofing and other applications are increasingly in short supply. These grades of asphalt are also becoming more and more expensive due to high demand and low supply.

In any case, to meet performance standards and product specifications, asphalt flux that is recovered from refining operations is normally treated or processed to attain desired physical characteristics and to attain uniformity. For instance, asphalt that is employed in manufacturing roofing products has to be treated to meet the special requirements demanded in roofing applications. More specifically, in the roofing industry it is important to prevent asphaltic materials from flowing under conditions of high temperature such as those encountered during hot summers. In other words, the asphaltic materials used in roofing products should maintain a certain level of stiffness (hardness) at high temperatures. This increased level of stiffness is characterized by a reduced penetration, an increased viscosity, and an increased softening point.

To attain the required level of stiffness and increased softening point that is demanded in roofing applications the asphalt flux is typically treated by an air blowing process. In such air blowing techniques, air is blown through the asphalt flux for a period of about 2 to about 8 hours while it is maintained at an elevated temperature which is typically within the range of 400° F. (204° C.) to 550° F. (288° C.). The air blowing process optimally results in the stiffness and the softening point of the asphalt flux being significantly increased. This is highly desirable because ASTM D 3462-96 (Standard Specification for Asphalt Shingles Made from Glass Felt and Surfaced with Mineral Granules) requires roofing asphalt to have a softening point which is within the range of 190° F. (88° C.) to 235° F. (113° C.) and for the asphalt to exhibit a penetration at 77° F. (25° C.) of above 15 dmm (1 dmm=0.1 mm). In fact, it is typically desirable for asphalt used in roofing applications to have a penetration which is within the range of 15 dmm to 35 dmm in addition to a softening point which is within the range of 185° F. (85° C.) to 235° F. (113° C.).

Air blowing has been used to increase the softening point and stiffness of asphalt since the early part of the twentieth century. For example, U.S. Pat. No. 2,179,208 describes a process wherein asphalt is air blown at a temperature of 300° F. (149° C.) to 500° F. (260° C.) in the absence of a catalyst for a period of 1 to 30 hours after which time a catalyst is added for an additional treatment period of 20 to 300 minutes at a temperature of 225° F. (107° C.) to 450° F. (232° C.). Over the years a wide variety of chemical agents have been used as air blowing catalysts. For instance, ferric chloride, $FeCl_3$ (see U.S. Pat. No. 1,782,186), phosphorous pentoxide, $P_2O_5$ (see U.S. Pat. No. 2,450,756), aluminum chloride, $AlCl_3$ (see U.S. Pat. No. 2,200,914), boric acid (see U.S. Pat. No. 2,375,117), ferrous chloride, $FeCl_2$, phosphoric acid, $H_3PO_4$ (see U.S. Pat. No. 4,338,137), copper sulfate CuSO, zinc chloride $ZnCl_2$, phosphorous sesquisulfide, $P_4S_3$, phosphorous pentasulfide, $P_2S_5$, and phytic acid, $C_6H_6O_6(H_2PO_3)_6$ (see U.S. Pat. No. 4,584,023) have all been identified as being useful as air blowing catalysts.

U.S. Pat. No. 2,179,208 discloses a process for manufacturing asphalts which comprises the steps of air-blowing a petroleum residuum in the absence of any added catalysts while maintaining the temperature at about 149° C. to 260° C. (300° F. to 500° F.) and then heating the material at a temperature at least about 149° C. (300° F.) with a small amount of a polymerizing catalyst. Examples of such polymerizing catalysts include chlorosulphonic, phosphoric, fluoroboric, hydrochloric, nitric or sulfuric acids and halides as ferric chloride, aluminum bromide, chloride, iodide, halides similarly of copper, tin, zinc, antimony, arsenic, titanium, etc. hydroxides of sodium, potassium, calcium oxides, sodium carbonate, metallic sodium, nitrogen bases, ozonides and peroxides. Blowing with air can then be continued in the presence of the polymerizing catalyst.

U.S. Pat. No. 2,287,511 discloses an asphalt manufacturing process which involves heating a residuum in the presence of the following catalysts: ferric chloride, aluminum bromide, aluminum chloride, aluminum iodide; halides of copper, tin, zinc, antimony, boron, titanium; hydroxides of sodium and potassium; calcium oxides, sodium carbonate, and metallic sodium. These catalysts are described as being present in the asphalt composition in the absence of any injected air. However, air may be injected prior to the addition of the above-cited polymerizing catalysts, but no air is injected when the catalysts have been added to the composition.

U.S. Pat. No. 4,000,000 describes a process for recycling asphalt-aggregate compositions by heating and mixing them with a desired amount of petroleum hydrocarbons containing at least 55% aromatics.

U.S. Pat. No. 2,370,007 reveals a process for oxidizing asphalt which involves air blowing a petroleum oil in the presence of a relatively small amount of certain types of catalysts. These catalysts are organic complexes of metallic salts. Examples of organic complexes of metallic salts that can be used include those obtained from sludges recovered in treating petroleum fractions with metallic salts, such as metallic halides, carbonates and sulfates. The sludge obtained in treating a cracked gasoline with aluminum chloride is disclosed as being particularly suitable in accelerating the oxidation reaction and in producing an asphalt of superior characteristics. The hydrocarbon stocks from which the organic complex of metallic salts may be produced are described as including various hydrocarbon fractions containing hydrocarbons which are reactive with the metallic salts, such as those containing olefinic hydrocarbons. Sludges obtained by treating olefins with aluminum chloride are also described as being useful in the process of this 1943 patent. Other sludges that are identified as being particularly useful can be obtained in the isomerization of hydrocarbons such as butane, pentane and naphtha in the presence of aluminum chloride. These sludges can be obtained by the alkylation of isoparaffins with olefins in the presence of such alkylating catalysts, such as boron trifluoride and the like.

Several patents describe the application of phosphoric mineral acids in modifying asphalt properties. For instance, U.S. Pat. No. 2,450,756 describes a process to make oxidized asphalts by air blowing petroleum hydrocarbon in the presence of a phosphorus catalyst, including phosphorus pentoxide, phosphorus sulfide, and red phosphorus. U.S. Pat. No. 2,762,755 describes a process of air blow asphaltic material in the presence of a small amount of phosphoric acid. U.S. Pat. No. 3,126,329 discloses a method of making blown asphalt through air blowing in the presence of a catalyst which is an anhydrous solution of 50 weight percent to 80 weight percent phosphorus pentoxide in 50 weight percent to 20 weight percent phosphoric acid having the general formula $H_mR_nPO_4$.

In general, the air blowing techniques described in the prior art share the common characteristic of both increasing the softening point and decreasing the penetration value of the asphalt flux being treated. In other words, as the asphalt flux is air blown, its softening point increases and its penetration value decreases over the duration of the air blowing procedure. It has been the conventional practice to air blow asphalt flux for a period of time that is sufficient to attain the desired softening point and penetration value. However, in the case of some asphalt fluxes, air blowing to the desired softening point using conventional procedures results in a penetration value which is too low to be suitable for utilization in roofing applications. These asphalt fluxes are called "hard asphalt fluxes". In other words, hard asphalt fluxes cannot be air blown using conventional procedures to a point where both the required softening point and penetration values are attained. Accordingly, there is a need for techniques that can be used to air blow hard asphalt flux to both a softening point which is within the range of 185° F. (85° C.) to 250° F. (121° C.) and a penetration value at 77° F. (25° C.) of above 15 dmm.

U.S. Pat. Nos. 4,659,389 and 4,544,411 disclose the preparation of satisfactory asphaltic roofing fluxes from otherwise unsatisfactory fluxes which involves the addition of asphaltenes, and saturates in quantities which satisfy certain specified conditions. Air oxidation of the flux is described in these patents as being surprisingly accelerated by the addition of highly branched saturates, especially in the presence of a carbonate oxidation catalyst. Some examples of saturates which are described in these patents as being useful in the method described therein include slack wax, petrolatums, hydrocarbyl species, and mixtures thereof.

U.S. Pat. No. 7,901,563 discloses a method for preparing an industrial asphalt comprising (1) heating an asphalt flux to a temperature which is within the range of about 400° F. (204° C.) to 550° F. (288° C.) to produce a hot asphalt flux, (2) sparging an oxygen containing gas through the hot asphalt flux for a period of time which is sufficient to increase the softening point of the asphalt flux to a value of at least 100° F. (38° C.), to produce an underblown asphalt composition; and (3) mixing a sufficient amount of a polyphosphoric acid throughout the underblown asphalt composition while the underblown asphalt composition is maintained at a temperature which is within the range of 200° F. (93° C.) to 550° F. (288° C.) to attain a softening point which is within the range of 185° F. (85° C.) to 250° F. (121° C.) and a penetration value of at least 15 dmm at 77° F. (25° C.) to produce the industrial asphalt. The techniques disclosed in this patent is useful in that it can be used to increase the softening point of hard asphalt flux to a commercially desirable level while maintaining the penetration value of the asphalt above 15 dmm at 77° F. (25° C.). Accordingly, this technique can be used to produce industrial asphalt having a desirable softening point and penetration value using hard asphalt flux as the starting material.

Asphalts have been modified with waxes to produce a variety of roofing and industrial products. For example, U.S. Pat. No. 4,382,989 discloses a roofing asphalt formulation containing oxidized coating grade asphalt, oxidized polyethylene and optionally saturant asphalt and filler. In one embodiment, the asphalt is oxidized to any degree, then unoxidized polyethylene is added, and then the oxidation process is continued to produce the roofing asphalt formulation. In a later improvement U.S. Pat. No. 4,497,921 discloses the addition of sulfur to stabilize the mix. U.S. Pat. No. 4,554,023 claims a method of making a roofing shingle asphalt by blending bis-stearoylamide wax into asphalt, including blown asphalt with the benefit of lowering the viscosity of the asphalt product being reported.

U.S. Pat. No. 7,317,045 reveals a modified bitumen composition for roofing application comprising: a polymer modifier consisting essentially of polyethylene; and asphalt, wherein the polyethylene consists of a mixture of high density polyethylene and low density polyethylene in a ratio ranging from about 4:1 to 1:4 LDPE to HDPE by weight, wherein the polyethlene is linear. The polyethylene can have a weight average molecular weight between about 1,000 and 25,000, a melt flow index value between about 5 and 50, and can be of a low density of less than 0.95 g/cm$^3$.

U.S. Pat. No. 7,857,904 reveals a process of producing a roofing shingle coating asphalt from an asphalt feedstock includes the following steps. Wax and blowing catalyst are added to the asphalt feedstock. Then the asphalt feedstock is blown to produce the coating asphalt. The coating asphalt has a softening point within a range of from about 190° F. (88° C.) to about 235° F. (113° C.) and has a penetration of at least about 15 dmm at 77° F. (25° C.).

U.S. Pat. No. 7,951,239 discloses a method of producing a roofing shingle coating asphalt from a non-coating grade asphalt feedstock includes the following steps. The non-coating grade asphalt feedstock is partially blown to lower its penetration to a first penetration that is within or close to a target penetration range of the coating asphalt, and to raise its softening point to a first softening point that is lower than a target softening point range of the coating asphalt. Then, a wax is added to the partially blown non-coating grade asphalt to further raise its softening point to a second softening point that is within the target softening point range to produce the coating asphalt.

U.S. Pat. No. 8,753,442 discloses method of producing a roofing shingle coating asphalt from a non-coating grade asphalt feedstock includes the following steps. The non-coating grade asphalt feedstock is partially blown to lower its penetration to a first penetration that is within or close to a target penetration range of the coating asphalt, and to raise its softening point to a first softening point that is lower than a target softening point range of the coating asphalt. A wax is added to the partially blown non-coating grade asphalt to further raise its softening point to a second softening point that is within the target softening point range to produce the coating asphalt. The wax may also be added during the blowing process. Resulting roofing coating asphalt compositions may comprise a paving grade asphalt and a wax, and yet still has desirable penetration, softening point and viscosity.

U.S. Pat. Nos. 8,808,445 and 8,926,742 describe a process for preparing an asphalt-coated crumb rubber composition that meets the specification set forth in ASTM D80-02 or deviations thereof which may be established by the specifying agency from time to time. This process generally comprises obtaining asphalt of different penetration grades, combining the asphalt of each grade with preselected chemicals to form separate premixed components, blending the premixed components together under predetermined conditions to form, upon curing, an asphalt-coated crumb rubber composition that meets certain physical requirements for asphalt-rubber binder (ARB), such as those set forth in ASTM D8-02. Advantageously, the resulting asphalt-coated crumb rubber composition not only meets the physical requirements of ARB used in road paving but also has improved dispersion of the rubber, such as dispersion of the rubber in an oil-in-water emulsion of an asphalt.

U.S. Pat. No. 8,901,211 reveals a method for preparing an industrial asphalt comprising sparging an oxygen containing gas through an asphalt flux in the presence of 0.25 weight percent to about 12 weight percent of a highly saturated rubbery polymer at a temperature within the range of about 400° F. to about 550° F. for a period of time which is sufficient to increase the softening point of the asphalt flux to a value which is within the range of 185° F. to 250° F. and a penetration value of at least 15 dmm to produce the industrial asphalt. The highly saturated rubbery polymer can be a styrene-ethylene/butylene-styrene block copolymer rubber or a highly saturated styrene-ethylene/propylene-styrene block copolymer rubber.

BRIEF DESCRIPTION OF THE DRAWING

FIG. 1 is a table which provides a summary of the properties of the compositions made in accordance with this invention and blends which were made in accordance with the prior art for comparative purposes.

SUMMARY OF THE INVENTION

This invention provides for a method for producing polymer modified asphalt (PMA) using base asphalt (bitumen) blended with partially air blown ("puffed") asphalt which is further modified with polymers and additives to attain desired properties for industrial applications. The partially blown or blown asphalt is oxidized to a target softening point to suit the application. In another embodiment of the invention, the base asphalt is blended with hard PEN asphalt ("Zero PEN Asphalt") which is further modified with polymers and additives to attain desired properties for industrial applications. By using the partially oxidized asphalt or blending the base asphalt with partially oxidized asphalt or hard PEN asphalt, the amount of polymers and additives needed to achieve desired properties and performance are significantly reduced. In fact, this technique can be used to attain polymer modified asphalt having a highly desirable combination of characteristics that could not otherwise be attained using the base asphalt.

This technique of blending partially air blown asphalt and/or hard PEN asphalt with base asphalt allows for the use of asphalt types and asphalt streams that would not otherwise be considered for use in making industrial asphalt having desired characteristics. In other words, the technique of this invention makes it possible to employ asphalt streams that would not otherwise be physically, mechanically or chemically suitable for use. In another embodiment of the invention, partially oxidized asphalt or blended asphalts are used in combination with polymers and additives, such as waxes and/or plasticizers to produce polymer modified asphalts of desired properties and performance. By utilizing asphalts that are partially blown or not blown at all, blow loss and emissions are significantly reduced thus providing a more environmentally friendly method of producing asphalt. This method allows for the production of industrial asphalt with reduced thermal history as compared to asphalt made with conventional air blowing processes. The softening points for the partially oxidized asphalts used in accordance with this invention can be adjusted to compensate for variations in the characteristic and quality of base asphalt streams. Accordingly, the technique of this invention provides a more forgiving process for treating base asphalt than is possible by practicing techniques of the prior art.

The technique of this invention allows for the use of base asphalts include paving grades, flux grades, PEN grades, viscosity grade, aged residue grades and the likes in making high quality industrial asphalt which is suitable for use in manufacturing asphalt roofing shingles and other value added products. The hard PEN asphalts that can be used include vacuum tower bottom asphalt, propane distilled asphalt, ROSE asphalt, oxidized or blown asphalt and the like. The polymers that can be employed in modifying the asphalt compositions of this invention include thermoplastic elastomers, more preferably styrenic block copolymers, polyolefins, acrylate copolymers, maleated polymers/resins, ground tire rubber, and the like. The waxes that can be included in the asphalt compositions of this invention include natural and synthetic waxes. The plasticizers that can be utilized in the asphalt compositions of this invention include aromatic oils, naphthenic oils, triglyceride oils (vegetable oils) and other forms of natural and synthetic oils.

The appropriate components ratios needed to produce the desired PMA may be batched together or consecutively added, if desired, and can be mixed using a high shear or low shear mill at 200° F. top 450° F. to obtain a homogeneous blend. The properties of these asphalt blend compositions can be tested using various analytical methods and ASTM Methods to establish fitness for use in particular applications such in coatings for roofing shingles, modified asphalt based adhesives, paving and other applications.

The present invention more specifically discloses a method for producing an industrial asphalt composition which comprises blending a partially blown asphalt or a hard PEN asphalt into an asphalt base which is selected from the group consisting of paving grade asphalts, flux grade asphalts, PEN grade asphalts, viscosity grade asphalts, and aged residue grade asphalts.

This invention also discloses an asphalt composition which is comprised of a base asphalt, a partially blown asphalt, a polymer modifier, and at least one wax.

The subject invention further reveals an asphalt composition which is comprised of a base asphalt, a hard PEN asphalt, a polymer modifier, and at least one wax.

DETAILED DESCRIPTION OF THE INVENTION

In accordance with this invention, partially oxidized or partially blown asphalt is further modified using polymers and/or additives. By using the partially oxidized asphalt or blending the base asphalt with partially oxidized asphalt or hard PEN asphalt, the amount of polymers and additives needed to achieve desired properties and performance are significantly reduced. Targeting various softening points for the partially oxidized asphalt which may or may not be blended with base asphalts (at various ratios) can be used to mitigate base asphalt quality variation. This technique of blending partially air blown asphalt and/or hard PEN asphalt with base asphalt broadens the types of asphalt available for use which would not otherwise be physically, mechanically or chemically suitable for use.

In the practice of this invention partially oxidized or partially blown asphalt and the base asphalt are blended and modified using polymers and/or additives. The partially blown asphalt has softening point which is within the range of 120° F. to 230° F., a penetration at 77° F. of 5 dmm to 30 dmm and a rotational viscosity of 120-450 cP at 400° F. More preferably the partially blown asphalt has softening point which is within the range of 140° F. to 190° F., a penetration at 77° F. which is within the range of 8 dmm to 16 dmm and a rotational viscosity which is within the range of 120 cP to 400 cP at 400° F.

Hard PEN grade asphalts ("Zero PEN asphalts") from refineries blended with base asphalts and modified with polymers and/or additives can be utilized in the practice of this invention. The hard PEN asphalt utilized in the process of this invention will have a softening point which is within the range of 140° F. to 240° F., a penetration at 77° F. of 0.5 dmm to 15 dmm and rotational viscosity which is within the range of 25 cP to 450 cP at 400° F. The hard PEN asphalt will preferable have a softening point which is within the range of 150° F. to 210° F., a penetration value at 77° F. which is within the range of 0.2 dmm to 10 dmm, and a rotational viscosity which is within the range of 140 cP to 350 cP at 400° F.

Partially blown asphalt and/or hard PEN asphalt and base asphalt are blended together and can be further modified using asphalt modification polymers and/or additional additives. The partially oxidized asphalt constitutes 5 weight percent to 95 weight percent of the PMA and more preferably 20 weight percent to 90 weight percent of the PMA. Asphalt blends made with hard PEN asphalt will typically contain from 5 weight percent to 50 weight percent of the hard PEN asphalt and 50 weight percent to 95 weight percent of the base asphalt. The asphalt blend will preferably contain from 5 weight percent to 40 weight percent of the hard PEN asphalt.

The polymers that can be used for asphalt modification in accordance with this invention include block copolymers, such as SBS, SEBS, copolymers of functionalized reactive elastomers (RET) or glycidyl acrylate copolymers of methyl, ethyl, butyl acrylates, and polyolefin homo-polymers and copolymers such as polypropylene, polypropylene/ethylene copolymers and the likes. Partially blown asphalt can be blended with a block copolymer such as SEBS or SBS and a wax to yield a PMA suitable for manufacturing roofing products, paving and other industrial applications. The hard PEN asphalt can also be blended with base asphalt which is further modified with a block copolymer such as SEBS or SBS and wax to yield PMA suitable for paving, manufacturing roofing products and other industrial applications. The partially blown asphalt or hard PEN asphalt can also be blended with base asphalt which is further modified with polyolefins, crumb rubber, or ground tire rubber and a wax to yield PMA suitable for manufacturing roofing products, road paving and other industrial applications.

In some cases, cross linking agents and co-agents may be used to improve polymer network and dispersion in the PMA. The wax used in such applications can be natural or synthetic and have a softening point which is within the range of 200° F. to 330° F., a penetration value at 77° F. which is within the range of 0.5 dmm to 15 dmm and a rotational viscosity of which is within the range of 2 cP to 100 cP at 400° F. and COC flash point of greater than 400° F. The wax will more preferably have a softening point which is within the range of 200° F. to 350° F., a penetration at 77° F. which is within the range of 0.5 dmm to 10 dmm and rotational viscosity which is within the range of 2 cP to 150 cP at 400° F. and a COC flash point of greater than 475° F.

The ground tire rubber that can be employed in the practice of this invention will typically have a particle size which is within the range of 80 to 300 mesh and will more preferably have a mesh size which is within the range of 140 to 200. The plasticizers that can be utilized in the practice of this invention include aromatic oils, naphthenic oils, triglyceride oils, vegetable oils, and other forms of natural and synthetic oils.

Where the polymer modified asphalt (PMA) has softening point which is within the range of 130° F. to 260° F., a penetration at 77° F. which is within the range of 12 dmm to 40 dmm, and a rotational viscosity which is within the range of 90 cP to 700 cP at 400° F. More preferably the modified asphalt will have a softening point which is within the range of 200° F. to 250° F., a penetration at 77° F. of 15 dmm to 32 dmm, and rotational viscosity which is within the range of 100 cP to 500 cP at 400° F.

The industrial asphalt produced can be used in making roofing products and other industrial products using standard procedures. For instance, the industrial asphalt can be blended with fillers, stabilizers (like limestone, stonedust, sand, granule, etc.), polymers, recycled tire rubber, recycled engine oil residue, recycled plastics, softeners, antifungal agents, biocides (algae inhibiting agents), and other additives. For instance, aggregate and/or fillers can be added to the PMA for the manufacture of building materials, roofing materials (shingles, cap sheets, rolls base sheets and the like), paving and other industrial applications. By utilizing asphalts that are partially blown or not blown at all, blow loss and emissions are significantly reduced thus providing a more environmentally friendly method of producing asphaltic coating.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

A series of blends were made in accordance with this invention and blends were also made in accordance with the prior art for comparative purposes. These blends were made with various paving grade asphalts which could not be processed using conventional techniques into industrial asphalt which would be useful in roofing applications. A summary of these compositions and their properties is reported in FIG. 1.

TABLE 1

| Block # | Base Asphalt | Partially Blown | % SBS | % PolyButadiene | % Resin | Softening Point (° F.) | Viscosity at 400° F. (cP) | PEN at 77° F. (dmm) |
|---|---|---|---|---|---|---|---|---|
| 7 | H1 | No | 0.00 | 0.00 | 0.00 | 132 | 31 | 33 |
|   | H1-1 | No | 6.50 | 0.00 | 4.00 | 237 | 310 | 17 |
| 8 | I1 | Yes | 0.00 | 0.00 | 0.00 | 210 | 209 | 12.3 |
|   | I1-2 | Yes | 0.00 | 6.00 | 0.00 | 225 | 263 | 16 |
| 9 | J1 | Yes |  | 0.00 | 0.00 | 178 | 144 | 13 |
|   | J1-2 | Yes | 0.00 | 8.50 | 0.00 | 211 | 193 | 18 |
| 10 | K1 | Yes | 0.00 | 0.00 | 0.00 | 184 | 143 | 13 |
|   | K-2 | Yes | 0.00 | 8.50 | 0.00 | 221 | 190 | 16 |

While certain representative embodiments and details have been shown for the purpose of illustrating the subject invention, it will be apparent to those skilled in this art that various changes and modifications can be made therein without departing from the scope of the subject invention.

What is claimed is:

1. An industrial asphalt composition consisting of:
a base asphalt, wherein the base asphalt is asphalt flux, and wherein the base asphalt is not air blown,
a partially blown asphalt, wherein the partially blown asphalt is asphalt flux,
a polymer modifier,
at least one wax,
optionally, one or more fillers,
optionally, one or more stabilizers,
optionally, one or more recycled tire rubber,
optionally, one or more recycled engine oil,
optionally, one or more recycled plastics,
optionally, one or more softeners,
optionally, one or more antifungal agents, and
optionally, one or more biocides,
and
wherein the industrial asphalt composition has softening point which is within the range of 130° F. to 260° F., a penetration at 77° F. which is within the range of 12 dmm to 40 dmm, and a rotational viscosity which is within the range of 90 cP to 700 cP at 400° F.

2. The industrial asphalt composition of claim 1 wherein the partially blown asphalt has a softening point which is within the range of 120° F. to 230° F., wherein the partially blown asphalt has a penetration value which is within the range of 5 dmm to 30 dmm at 77° F., wherein the partially blown asphalt has a rotational viscosity which is within the range of 120 cP to 450 cP at 400° F.

3. The industrial asphalt composition of claim 1 wherein the industrial asphalt composition includes 5 weight percent to 95 weight percent of the partially blown asphalt and from 5 weight percent to 95 weight percent of the base asphalt.

4. The industrial asphalt composition of claim 1 wherein the polymer modifier is present at a level which is within the range of 0.5 weight percent to 12 weight percent, and wherein the wax is present at a level which is within the range of 0.5 weight percent to 5 weight percent.

5. The industrial asphalt composition of claim 1 wherein the polymer modifier is selected from the group consisting of SBS, SEBS, copolymers of functionalized reactive elastomers (RET) or glycidyl acrylate copolymers of methyl, ethyl, butyl acrylates, and polyolefin homo-polymers and copolymers.

6. The industrial asphalt composition of claim 1 wherein the wax has a softening point which is within the range of 200° F. to 330° F., a penetration value at 77° F. which is within the range of 0.5 dmm to 15 dmm, and a rotational viscosity which is within the range of 2 cP to 100 cP at 400° F., and COC flash point of greater than 400° F.

7. An industrial asphalt composition consisting of:
a base asphalt, wherein the base asphalt is asphalt flux,
a hard PEN asphalt, wherein the hard PEN asphalt is asphalt flux,
a polymer modifier,
at least one wax,
optionally, one or more fillers,
optionally, one or more stabilizers,
optionally, one or more recycled tire rubber,
optionally, one or more recycled engine oil,
optionally, one or more recycled plastics,
optionally, one or more softeners,
optionally, one or more antifungal agents, and
optionally, one or more biocides,
wherein the hard PEN asphalt has a penetration value which is within the range of 0.2 dmm to 15 dmm at 77°, and
wherein the industrial asphalt composition has softening point which is within the range of 130° F. to 260° F., a penetration at 77° F. which is within the range of 12 dmm to 40 dmm, and a rotational viscosity which is within the range of 90 cP to 700 cP at 400° F.

8. The industrial asphalt composition of claim 7 wherein the hard PEN asphalt has a softening point which is within the range of 140° F. to 240° F., wherein the hard PEN asphalt has a penetration value which is within the range of 0.2 dmm to 10 dmm at 77° F., and wherein the hard PEN asphalt has a rotational viscosity which is within the range of 25 cP to 450 cP at 400° F.

9. The industrial asphalt composition of claim 7 wherein the industrial asphalt composition includes 5 weight percent to 95 weight percent of the hard PEN asphalt and from 5 weight percent to 95 weight percent of the base asphalt.

10. The industrial asphalt composition of claim 7 wherein the polymer modifier is present at a level which is within the range of 0.5 weight percent to 12 weight percent, and wherein the wax is present at a level which is within the range of 0.5 weight percent to 5 weight percent.

11. The industrial asphalt composition of claim 7 wherein the polymer modifier is selected from the group consisting of SBS, SEBS, copolymers of functionalized reactive elastomers (RET) or glycidyl acrylate copolymers of methyl, ethyl, butyl acrylates, and polyolefin homo-polymers and copolymers.

12. The industrial asphalt composition of claim 7 wherein the wax has a softening point which is within the range of 200° F. to 330° F., a penetration value at 77° F. which is within the range of 0.5 dmm to 15 dmm, and a rotational viscosity which is within the range of 2 cP to 100 cP at 400° F., and COC flash point of greater than 400° F.

13. The industrial asphalt composition of claim 7 wherein the industrial asphalt composition has softening point which is within the range of 130° F. to 260° F., a penetration at 77° F. which is within the range of 12 dmm to 40 dmm, and a rotational viscosity which is within the range of 90 cP to 700 cP at 400° F.

14. A method for producing an industrial asphalt composition comprising blending into an asphalt base materials consisting of:
   a partially blown asphalt or a hard PEN asphalt,
   a polymer modifier,
   at least one wax,
   optionally, one or more fillers,
   optionally, one or more stabilizers,
   optionally, one or more recycled tire rubber,
   optionally, one or more recycled engine oil,
   optionally, one or more recycled plastics,
   optionally, one or more softeners,
   optionally, one or more antifungal agents, and
   optionally, one or more biocides,
   wherein the asphalt base is not air blown, wherein the base asphalt is asphalt flux, wherein the partially blown asphalt or hard PEN asphalt is asphalt flux, and wherein the industrial asphalt composition has softening point which is within the range of 130° F. to 260° F., a penetration at 77° F. which is within the range of 12 dmm to 40 dmm, and a rotational viscosity which is within the range of 90 cP to 700 cP at 400° F.

15. The method of claim 14 wherein partially blown asphalt is blended into the asphalt base, wherein the partially blown asphalt has a softening point which is within the range of 120° F. to 230° F., wherein the partially blown asphalt has a penetration value which is within the range of 5 dmm to 30 dmm at 77° F., and wherein the partially blown asphalt has a rotational viscosity which is within the range of 120 cP to 450 cP at 400° F.

16. The method of claim 14 wherein the hard PEN asphalt is blended into the asphalt base, wherein the hard PEN asphalt has a softening point which is within the range of 140° F. to 240° F., wherein the hard PEN asphalt has a penetration value which is within the range of 0.5 dmm to 15 dmm at 77° F., and wherein the hard PEN asphalt has a rotational viscosity which is within the range of 25 cP to 450 cP at 400° F.

17. The method of claim 14 wherein 20 weight percent to 80 weight percent of the hard PEN asphalt is blended into 20 weight percent to 80 weight percent of the base asphalt, wherein the hard PEN asphalt has a penetration value which is within the range of 0.2 dmm to 10 dmm at 77° F., wherein a polymer modifier is further blended into the asphalt base at a level which is within the range of 0.5 weight percent to 12 weight percent, and wherein a wax is further blended into the asphalt base at a level which is within the range of 0.5 weight percent to 5 weight percent.

* * * * *